(12) United States Patent
Chae et al.

(10) Patent No.: US 7,232,552 B2
(45) Date of Patent: Jun. 19, 2007

(54) APPARATUS FOR DECOMPOSING PERFLUORINATED COMPOUNDS AND SYSTEM FOR PROCESSING PERFLUORINATED COMPOUNDS USING THE APPARATUS

(75) Inventors: Seung-ki Chae, Seoul (KR); Sang-gon Lee, Suwon (KR); In-ju Lee, Ulsan (KR); Kyoung-hye Lee, Seoul (KR); Yong-hee Lee, Shiheung (KR); Jin-ok Jung, Shiheung (KR); Young-jo Shin, Shiheung (KR)

(73) Assignees: Samsung Electronics Co., Ltd., Suwon, Kyungki-do (KR); Forhuman Co., Ltd., Shiheung, Kyungki-do (KR)

( * ) Notice: Subject to any disclaimer, the term of this patent is extended or adjusted under 35 U.S.C. 154(b) by 721 days.

(21) Appl. No.: 10/423,870

(22) Filed: Apr. 28, 2003

(65) Prior Publication Data
US 2003/0201168 A1     Oct. 30, 2003

(30) Foreign Application Priority Data
Apr. 29, 2002   (KR) .................. 10-2002-0023508

(51) Int. Cl.
*B01J 19/08*    (2006.01)
(52) U.S. Cl. ........................... 422/186.04; 96/97

(58) Field of Classification Search ........... 422/186.04; 96/97
See application file for complete search history.

(56) References Cited

U.S. PATENT DOCUMENTS

| | | | | |
|---|---|---|---|---|
| 5,236,672 A * | 8/1993 | Nunez et al. | .......... | 422/186.04 |
| H1701 H | 1/1998 | DePinto et al. | | |
| 5,847,494 A * | 12/1998 | Bayliss et al. | .......... | 313/231.31 |
| 6,224,653 B1 * | 5/2001 | Shvedchikov et al. | .......... | 95/58 |
| 6,576,573 B2 * | 6/2003 | Arno | .......... | 438/798 |

FOREIGN PATENT DOCUMENTS

| KR | 2001-0002466 | 1/2001 |
|---|---|---|
| KR | 2002-0015796 | 3/2002 |

* cited by examiner

*Primary Examiner*—Kishor Mayekar
(74) *Attorney, Agent, or Firm*—Volentine & Whitt, PLLC

(57) ABSTRACT

The apparatus for decomposing PFCs includes an external electrode unit which is coupled to a reference voltage and which defines a flow space for the flow of the PFCs, and an internal electrode unit which is located within the flow space of the external electrode unit so as to define a reaction space between the internal electrode unit and the external electrode unit. The apparatus is also equipped with a voltage supply unit which applies an alternating voltage to the internal electrode unit which is of sufficient voltage and frequency to generate an electron beam within the reaction space which is capable of decomposing the PFCs.

8 Claims, 12 Drawing Sheets

APPARATUS FOR DECOMPOSING PERFLUORINATED COMPOUNDS AND SYSTEM FOR PROCESSING PERFLUORINATED COMPOUNDS USING THE APPARATUS

BACKGROUND OF THE INVENTION

1. Field of the Invention

The presents invention relates to an apparatus for decomposing perfluorinated compounds and to a system for processing perfluorinated compounds.

A claim of priority is made to Korean Patent Application No. 2002-23508, filed in the Korean Intellectual Property Office on Apr. 29, 2002, the entirety of which is incorporated herein in by reference.

2. Description of the Related Art

Perfluorinated compounds (PFCs) are toxic waste gases generated and exhausted into the air during the manufacture of semiconductor devices. PFCs are commonly used in dry etching, chemical vapor deposition, and chamber cleaning processes. Typical examples of PFCs include $CF_4$, $C_2F_6$, $C_3F_8$, $CHF_3$, $NF_3$, $SF_6$, and the like. PFCs are very stable compounds inherently having a strong binding force, so they are resistant to decomposition and have a long lifespan. Furthermore, the global warming potential of PFCs is much higher than that of carbon oxide, which has prompted the World Semiconductor Council to voluntarily take steps to reduce the discharge of the PFCs.

A conventional technique for processing PFCs exhausted during the manufacture of semiconductor devices is disclosed in U.S. Statutory Invention Registration (SIR) No. H1701. According to this method, fluorine in the exhaust gas is reacted with aluminum to produce $AlF_3$ as a waste form. However, the addition of aluminum increases costs. In addition, the requirement for additional equipment for processing the reaction product increases the overall processing system size and maintenance and management functions.

There exist a variety of PFC processing methods, including a method involving the addition of alkaline earth metals and a powerful reducing agent, a method involving high-temperature combustion, and a method involving the removal of particles from the exhaust gas, the addition of hydrogen or water and oxygen, and thermal decomposition above 600° C. Recently, a method for removing PFCs through exposure to a process gas in a plasma state at 10,000 K and rapid cooling has been proposed. However, in such a high-temperature thermal plasma technique, it is necessary to heat the process gas to at least 600° C. and to keep this high temperature level for a period of time, and thus energy consumption is high. Moreover, the throughput and performance are not high when compared with labor and cost inputs.

According to most techniques using low-temperature plasma, similar to the above-described U.S. SIR, PFCs are converted into solid waste particles by the addition of alkaline earth metals or other additives. However, as described above, these techniques are considered to be uneconomical due to the need for collateral equipment, and the accompanying maintenance and management costs.

SUMMARY OF THE INVENTION

The present invention provides an apparatus for decomposing perfluorinated compounds (PFCs), which can be adapted to be directly equipped in a gas exhaust duct, rather than as independent equipment, and which decomposes a large amount of PFCs contained in an exhaust gas from the gas exhaust duct by applying electrical energy to the exhaust gas. The apparatus can be conveniently maintained and managed, and allows for a high-throughput.

The invention also provides an apparatus for decomposing PFCs, in which an electron beam and plasma oscillations are induced by high-voltage application of high-density, high frequency waves across an entire path of PFC gas, thus improving processing efficiency.

The invention also provides a system for processing PFCs using any of the apparatus for decomposing PFCs of the invention.

According to an aspect of the present invention, there is provided an apparatus for decomposing PFCs, the apparatus including an external electrode unit which is coupled to a reference voltage and which defines a space for allowing the PFC to flow, an internal electrode unit located within the space of the external electrode unit to define a reaction space between the internal electrode unit and the external electrode unit, and a voltage supply unit which applies an alternating voltage to the internal electrode unit of sufficient voltage and frequency to generate an electron beam within the reaction space which is capable of decomposing the PFCs.

The internal electrode unit may have a polygonal, such as rectangular or octagonal cross-section, or an elliptical cross-section, and preferably, a perfectly circular cross-section for uniform electric field generation. The external electrode unit may be formed to be cylindrical.

The internal electrode unit is assembled from a plurality of annular plates with a plurality of protruding implanter poles spaced from each other at regular intervals along the outer edge of each of the annular plates, and a plurality of guide rings interposed between each of the annular plates to regularly space the annular plates.

The implanter poles are formed to have a needle-like shape protruding along the edge of each of the annular plates, and the number of implanter poles for each annular plate is in the range of 30-110, and preferably, equal to 75.

For processing efficiency, it is preferable that the internal electrode unit be assembled such that the implanter poles between adjacent annular plates are displaced by a predetermined angle, and preferably, 1.2 degrees when 75 implanter poles are formed on each annular plate. To efficiently decompose and remove PCFs, it is preferable that the thickness of the guide rings be 2.5-3.5 times greater than that of the annular plates.

In a PFC decomposing apparatus according to the present invention, the voltage supply unit includes a support unit that is electrically connected to and supports the internal electrode unit with a constant separation gap from the external electrode unit, and a voltage generator that generates the alternating voltage to be applied to the internal electrode unit via the support unit.

The support unit may be constructed to support both ends of the internal electrode unit. A shaft penetrating through the internal electrode unit may be further coupled to the support unit supporting both ends of the internal electrode unit.

The voltage generator may comprise a crowbar circuit using the characteristics of a high voltage capacitor. The high voltage generator may use a line pulser device which generates rectangular high-voltage current pulses for rapid charging.

According to another aspect of the present invention, there is provided a system for processing PFCs, the system including a pumping unit that pumps out the PFCs from a reaction chamber, a decomposition apparatus that applies electrical energy to the PFCs discharged by the pumping unit to decompose the PFCs into compounds that can be wet processed, and a scrubber that wet process the compounds which have been decomposed by the decomposition apparatus.

Examples of such a reaction chamber include a dry etching chamber, a chemical vapor deposition chamber, etc. using the PFC gas. A plurality of PFC decomposing apparatuses may be connected in series or in parallel for higher processing capacity of the system.

According to embodiments of the present invention, PFCs are allowed to flow through a reaction space formed by an internal electrode unit which has implanter poles capable of emitting an electron beam at an ambient temperature and pressure in response to the application of a high voltage, and an external electrode unit formed to surround the internal electrode unit. As a high-frequency voltage is applied to the implanter poles of the internal electrode unit and high-energy electron beams are generated by the implanter poles, the binding structure of the PFCs is dissociated into compounds, such as water or carbon dioxide, that are likely to decompose by subsequent wet processing in a scrubber.

BRIEF DESCRIPTION OF THE DRAWINGS

The above and other features and advantages of the present invention will become more readily apparent from the detailed description that follows, with reference to the accompanying drawings, in which.

DETAILED DESCRIPTION OF THE PREFERRED EMBODIMENTS

The present invention will be described more fully with reference to the accompanying drawings, in which exemplary embodiments of the invention are shown. This invention may, however, be embodied in many different forms and should not be construed as being limited to the embodiments set forth herein. Rather, the embodiments are provided so as to fully convey the concept of the invention to those skilled in the art.

Figure 1:
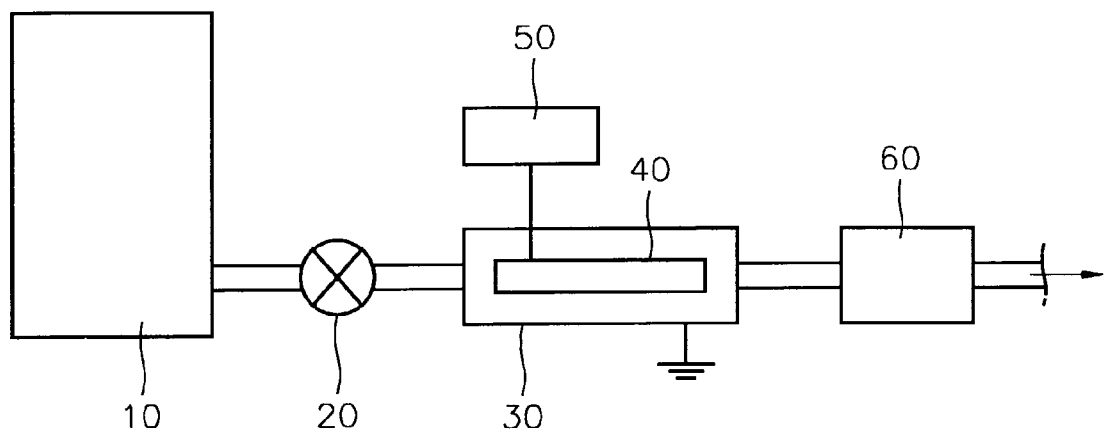
FIG. 1 is a schematic view of a system for processing perfluorinated compounds (PFCs) according to an embodiment of the present invention.

FIG. 1 is a schematic view of a processing system for perfluorinated compounds (PFCs) according to an embodiment of the present invention. Referring to FIG. 1, a pumping unit 20 pumps out an exhaust gas containing PFCs such as $CF_4$, $C_3F_6$, $C_3F_3$, $CHF_3$, $NF_3$, $SF_6$, etc., from a reaction chamber 10. The reaction chamber 10 is where dry etching or chemical vapor deposition has been performed using the PFCs in the manufacture semiconductor integrated circuits or liquid crystal displays (LCDs). The exhaust gas containing the PFCs pumped out by the pumping unit 20 is processed in a decomposing apparatus according to the present invention, and then in a scrubber 60, and finally is discharged into the air.

The PFC decomposing apparatus according to the embodiment includes an external electrode unit 30 connected to a reference voltage such as ground, an internal electrode unit 40 arranged inside the external electrode unit 30, and a high voltage supply unit 50 which supplies a high voltage to the internal electrode unit 40.

The exhaust gas containing the PFCs pumped out by the pumping unit 20 is allowed to flow through the cylindrical external electrode unit 30 at an ambient temperature and pressure. At this time, as a high voltage is applied to the internal electrode unit 40, a strong electric field is generated in a reaction space between the external electrode unit 30 and the internal electrode unit 40, and the internal electrode unit 40 emits an electron beam of a high electrical potential or a vapor laser beam. The electron beam decomposes the binding structure of the PFCs flowing through the reaction space into compounds, such as water or carbon dioxide, that are likely to be processed during a wet process performed in the scrubber 60.

Figure 2:
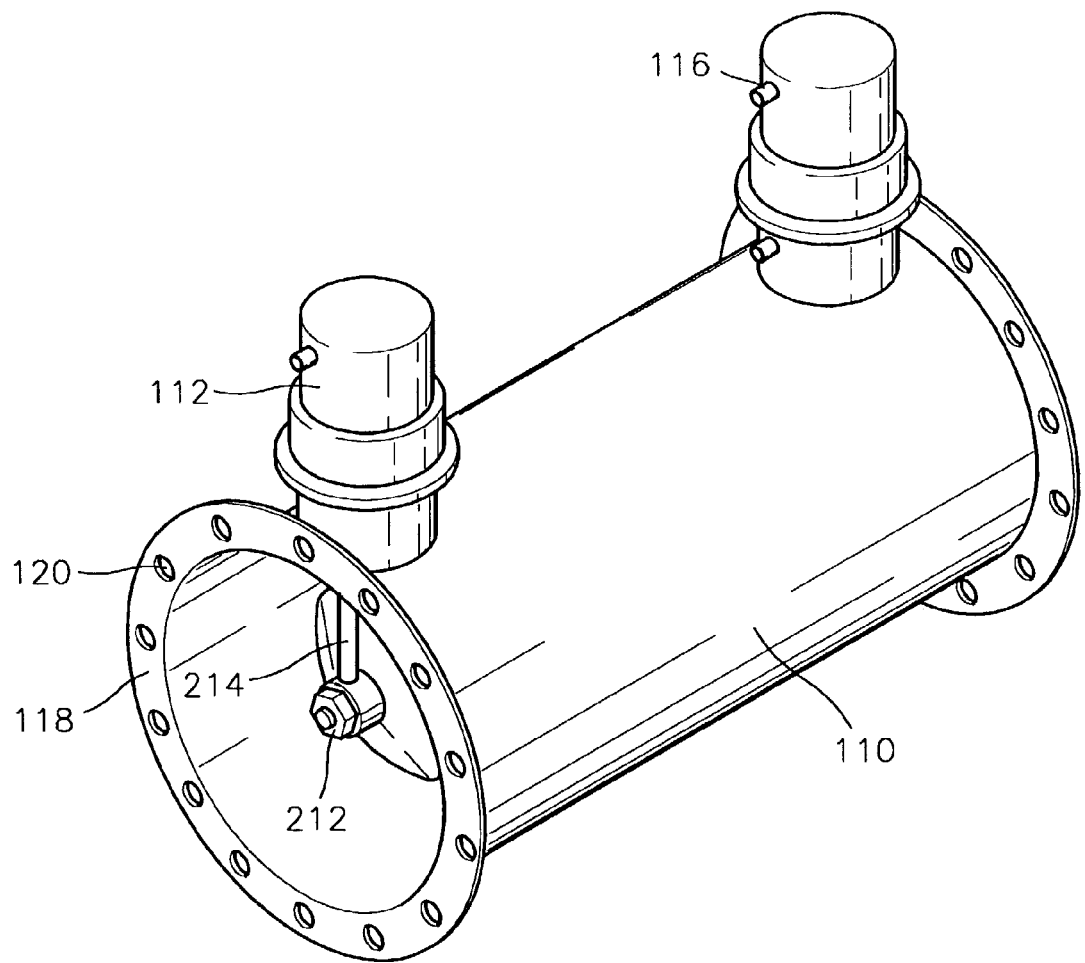
FIG. 2 is a perspective view of an apparatus for decomposing PFCs according to an embodiment of the present invention.
Figure 3:
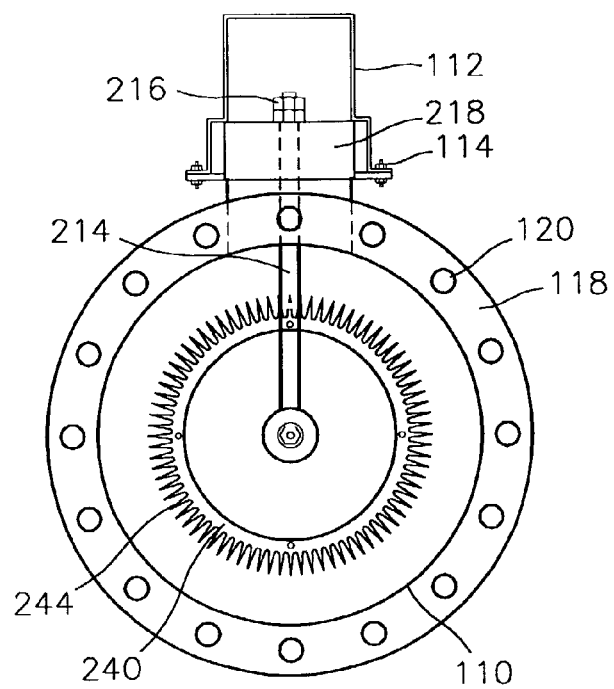
FIG. 3 is a sectional view of the PFC decomposing apparatus shown in FIG. 2.
Figure 4:
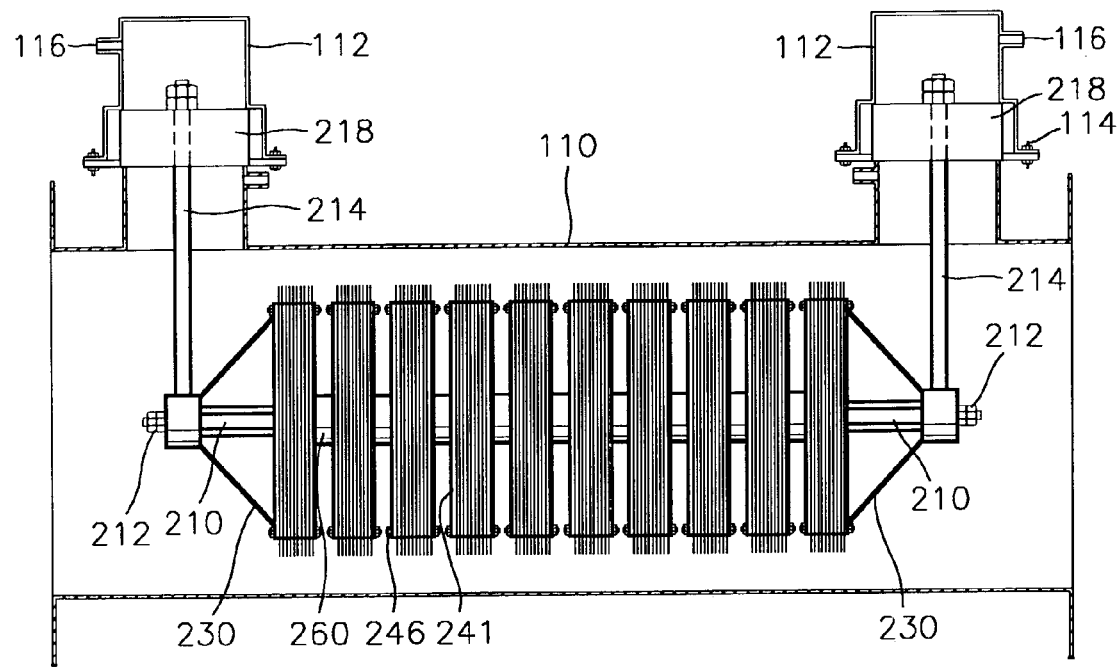
FIG. 4 is a longitudinal sectional view of the PFC decomposing apparatus shown in FIGS. 2 and 3.
Figure 5:
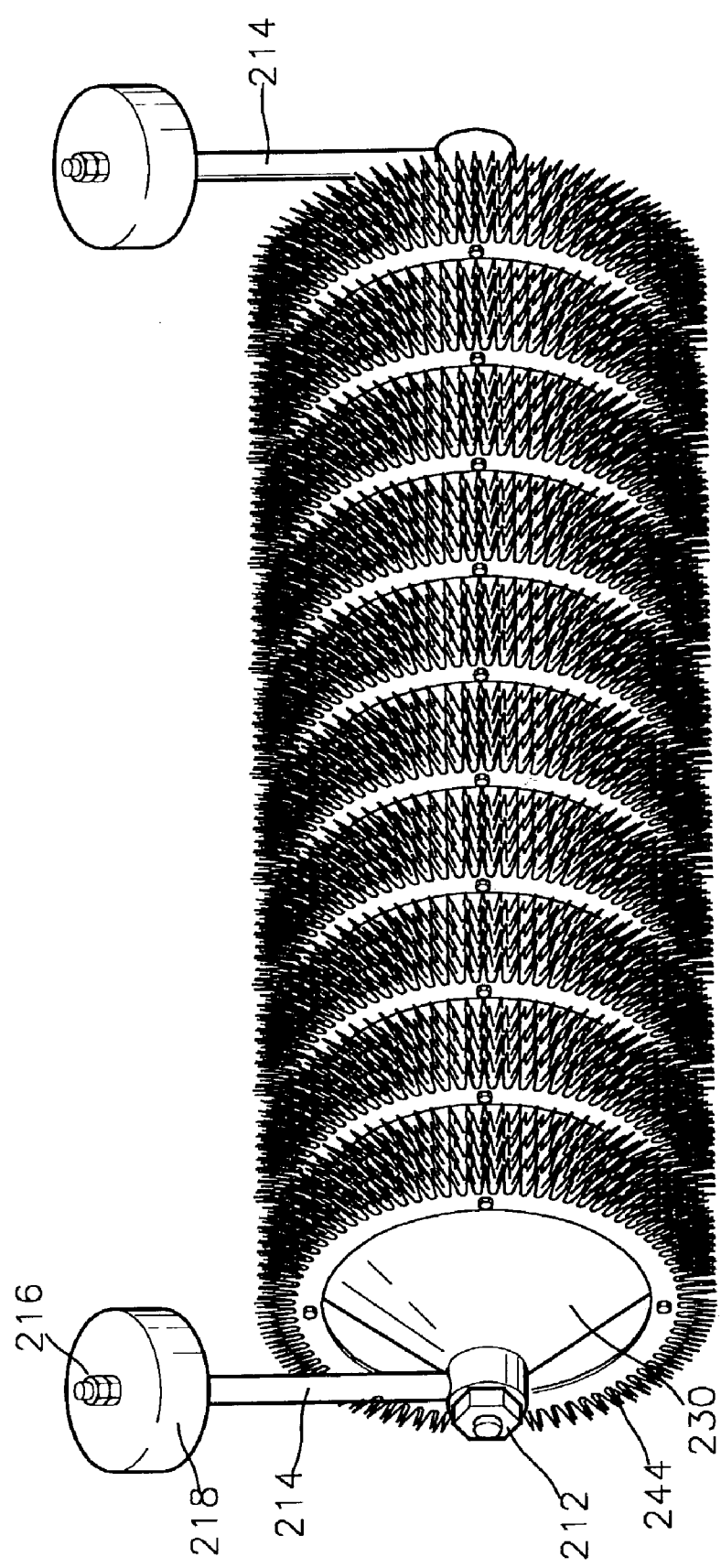
FIG. 5 is a perspective view of an internal electrode unit of the PFC decomposing apparatus of FIG. 2.

FIG. 2 is a perspective view of the PFC decomposing apparatus according to an embodiment of the present invention. FIG. 3 is a sectional view of the PFC decomposing apparatus shown in FIG. 2. FIG. 4 is a longitudinal sectional view of the PFC decomposing apparatus shown in FIGS. 2 and 3.

Referring to FIGS. 2 through 4, the external electrode unit (30 in FIG. 1) is constituted as a cylindrical housing 110 having a circular cross-section. The cylindrical housing 110 may be formed of a stainless steel, such as SUS, and is grounded, as shown in FIG. 1. Flanges 118 having a plurality of coupling holes 120 are formed on both sides of the housing 110. A plurality of housings 110 may be connected in series through the coupling holes 120.

The internal electrode unit 40 may be formed to have a polygonal, such as rectangular or octagonal, cross-section, or an elliptical cross-section. In the present embodiment, the internal electrode unit 40 is formed to have a circular cross-section to correspond to the cylindrical external electrode unit 30. When the external electrode unit 30 and the internal electrode unit 40 are configured to have a circular cross-section as in the present embodiment, they are evenly affected thermally, physically, and chemically as the PFCs flowing through the reaction space between the external electrode unit 30 and the internal electrode unit 40 react with the electric energy emitted from the electrodes of the internal electrode unit 40. Therefore, the displacement or deformation of the electrode units can be minimized even after operation for a long duration. In addition, electrical energy can be uniformly supplied to all of the electrodes of the internal electrode unit 40 via a shaft 210, thereby ensuring stable operation of the decomposing apparatus.

Regarding the topography of the internal electrode unit 40, generally, electrodes emitting anions are formed to have a needle-like shape. The shape and size of the electrodes determine the features of electrical energy generated thereby and the electrical characteristics of the reaction space by the electrical energy. In addition, in a case where a number of electrodes which are the same in size and shape are arranged cylindrically on the surface of the internal electrode unit 40, the radius of the cylindrically arranged electrodes as well as the number of electrodes and their spacing between the electrodes affect power consumption and the intensity of the energy emitted by the electrodes. The structure of the external electrode unit 30, which is disposed to surround the internal electrode unit 40, greatly affects the PFC processing efficiency, and thus needs to be considered for consistent and stable processing.

As a result of performance tests conducted on various electrodes of different shapes and sizes using a standard $CF_4$ gas, it was found that arranging a plurality of sharp implanter poles 244 acting as electrodes along the edge of an annular plate 240 to be evenly spaced from each other, as shown in FIG. 3, is the most appropriate configuration for processing harmful gases containing a large amount of PFCs exhausted during the manufacture of semiconductor integrated circuits.

When the diameter of the annular plate 240 with the implanter poles 244 was small, the self-charging capacity of the system was too small to generate a sufficient amount of energy for processing toxic substances, such as $CF_4$, thereby resulting in a sharp decrease in processing performance. When the diameter of the annular plate 240 was large, power consumption unnecessarily increased, and system durability ensuring a longer period of use was degraded.

Figure 10:
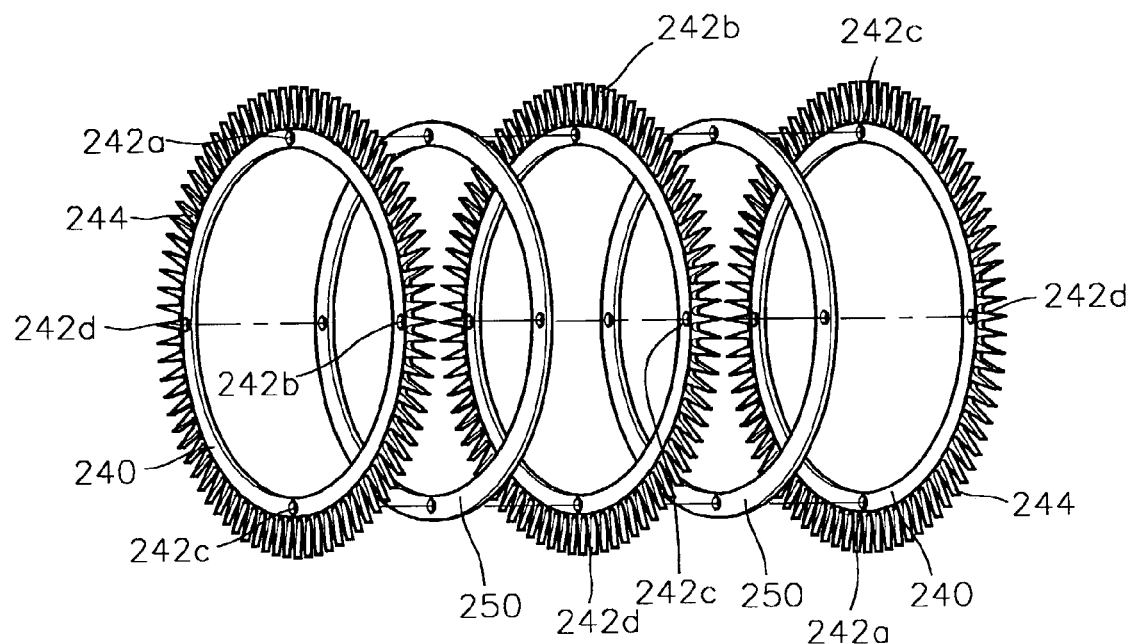
FIG. 10 is a partial exploded perspective view of the sub-unit of the internal electrode unit shown in FIG. 8.
Figure 11:
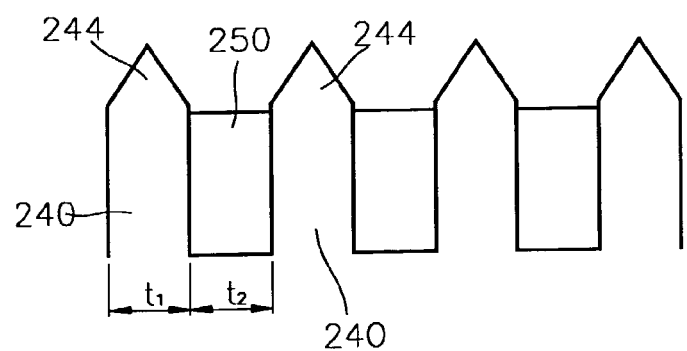
FIG. 11 comparatively illustrates the thicknesses of an annular plate and a guide ring shown in FIG. 10.

Referring to FIG. 10, such a hollow structure of the annular plate 240 with the implanter poles 244 was considered in order to reduce the weight of the system. However, the annular plate 240 showed an energy charging capacity that is about 25% lower than a solid plate. To overcome this drawback of the annular plate 240, in the present embodiment according to the present invention, a guide ring 250 is interposed between adjacent annular plates 240, wherein the guide ring 250 is formed to have a thickness $t_2$ about 2.5-3.5 times greater than the annular plate 240 with the implanter poles 244 having a thickness $t_1$, as shown in FIG. 11, so that the energy charging capacity is improved.

Based on the results of the performance tests carried out in the present embodiment while changing the shape and number of electrodes and using accessories, a circular arrangement of a number of implanter poles 244 was determined to be most suitable. Also, a total of 75 implanter poles 244 was considered to be suitable for each annular plate 240. If the number of implanter poles 244 is increased over 1.5 times (i.e., to about 110 pieces), any impacted implanter poles 244 may be deformed while moving, installing, or handling the system. Such deformation of the implanter poles 244 is considered to be a main cause of degradation in system reliability. If the number of implanter poles 244 for each annular plate 240 is less than 30, a sufficient amount of electrical energy for electrical and chemical processing cannot be generated.

Figure 8:
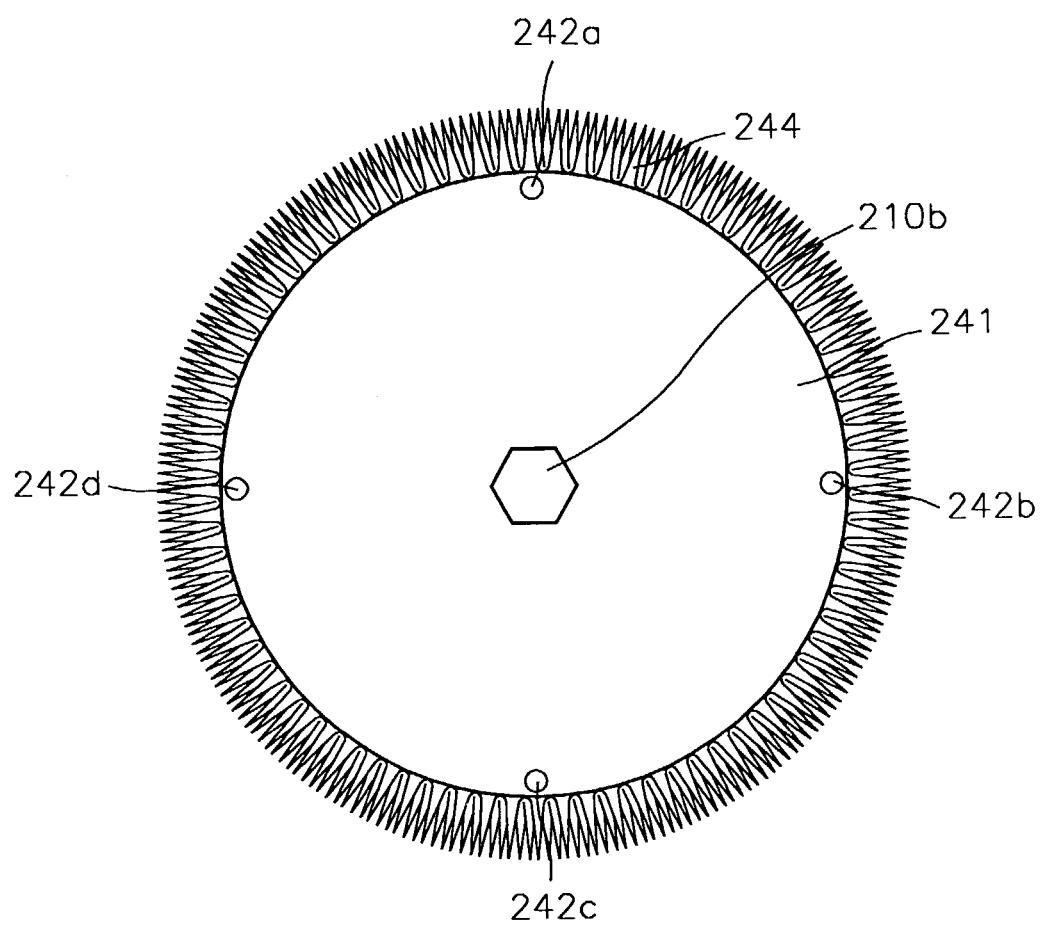
FIG. 8 is a front view of a sub-unit of the internal electrode unit of the PFC decomposing apparatus shown in FIGS. 2 and 3.
Figure 9:
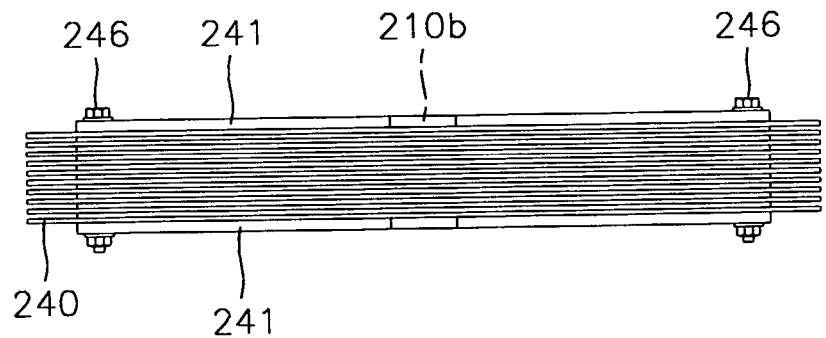
FIG. 9 is a side view of the sub-unit of the internal electrode unit shown in FIG. 8.

The structure of the internal electrode unit 40 will be described in more detail with reference to FIGS. 4 and 8 through 11. FIG. 8 is a front view of a sub-unit of the internal electrode unit of the PFC decomposing apparatus shown in FIGS. 2 and 3. FIG. 9 is a side view of the sub-unit of the internal electrode unit shown in FIG. 8. FIG. 10 is a partial exploded perspective view of the sub-unit of the internal electrode unit shown in FIG. 8. FIG. 11 comparatively illustrates the thicknesses of the annular plate 244 and the guide ring 250 shown in FIG. 10.

In the present embodiment of a PFC decomposing apparatus according to the present invention, 75 implanter poles 244 are arranged on the edge of each annular plate 240. As shown in FIGS. 4 and 9, 10 sheets of annular plates 240 are assembled into one sub-unit, and a total of ten sub-units are incorporated into the PFC decomposing apparatus according to the present invention. Accordingly, the total number of implanter poles 244 for one PFC decomposing apparatus according to the present embodiment amounts to 7500.

Regarding the assembly state of the internal electrode unit 40, referring to FIGS. 8 through 10, ten annular plates 240 and nine guide rings 250 are alternately arranged such that their coupling holes 242a, 242b, 242c, and 242d match and then assembled into a single sub-unit by inserting coupling bolts 246 into the coupling holes 242a, 242b, 242c, and 242d. All of the annular plates 240 for each sub-unit may be formed to have a hollow structure. Alternatively, the first and last annular plates 240 for each sub-unit may be formed as solid plates but having a hexagonal shaft hole 210b at their center, as shown in FIGS. 8 and 9.

When a plurality of annular plates 240, each of which has 75 implanter poles 244, are assembled into a single sub-unit, for a high processing efficiency, the relative positions of the individual annular plates 240 need to be adjusted such that the implanter poles 244 of each of the annular plates 240 are displaced from those of adjacent annular plates 240 by 1.2 degrees. To this end, when the annular plates 240 and the guide rings 250 are bound together, each annular plate 240 is rotated with respect to the previous one by 90 degrees such that, for example, the coupling hole 242a of the first annular plate 240 matches the coupling hole 242b of the next annular plate 240, as shown in FIG. 10, so that the implanter poles 244 between the adjacent annular plates 240 are displaced from each other by 1.2 degrees. In order to make the assembly of the annular plates 240 easier, a single annular plate unit previously assembled from ten sheets of annular plates 240 may be used for convenience in assembling, transport, installation, and maintenance.

As described above with reference to FIG. 11, in order to decompose and remove comparatively stable, non-reactive PFCs, such as $NF_3$, $C_3F_8$, etc., the thickness $t_2$ of the guide rings 250 should preferrably be about 2.5-3.5 times greater than the thickness $t_1$ of the annular plates 240 with the implanter poles 244. If the thickness $t_2$ of the guide rings 250 is less than or equal to the thickness $t_1$ of the annular plates 240, it is difficult to expect a desired processing efficiency. In particular, the greatest processing efficiency is ensured when the thickness $t_2$ of the guide rings 250 is about 2.5-3.5 times greater than the thickness $t_1$ of the annular plates 240. If the thickness $t_2$ of the guide rings 250 is more than 3.5-5.5 times greater than the thickness $t_1$ of the annular plates 240, the processing efficiency decreases by about 30% from the greatest processing efficiency. If the thickness $t_2$ of the guide rings 250 is smaller than or equal to the thickness $t_1$ of the annular plates 240, the processing efficiency decreases by about 30% from the greatest processing efficiency. If the thickness $t_2$ of the guide rings 250 is no more than 2.0 times greater than the thickness $t_1$ of the annular plates 240, the processing efficiency decreases by 50% with respect to the greatest processing efficiency.

Figure 7:
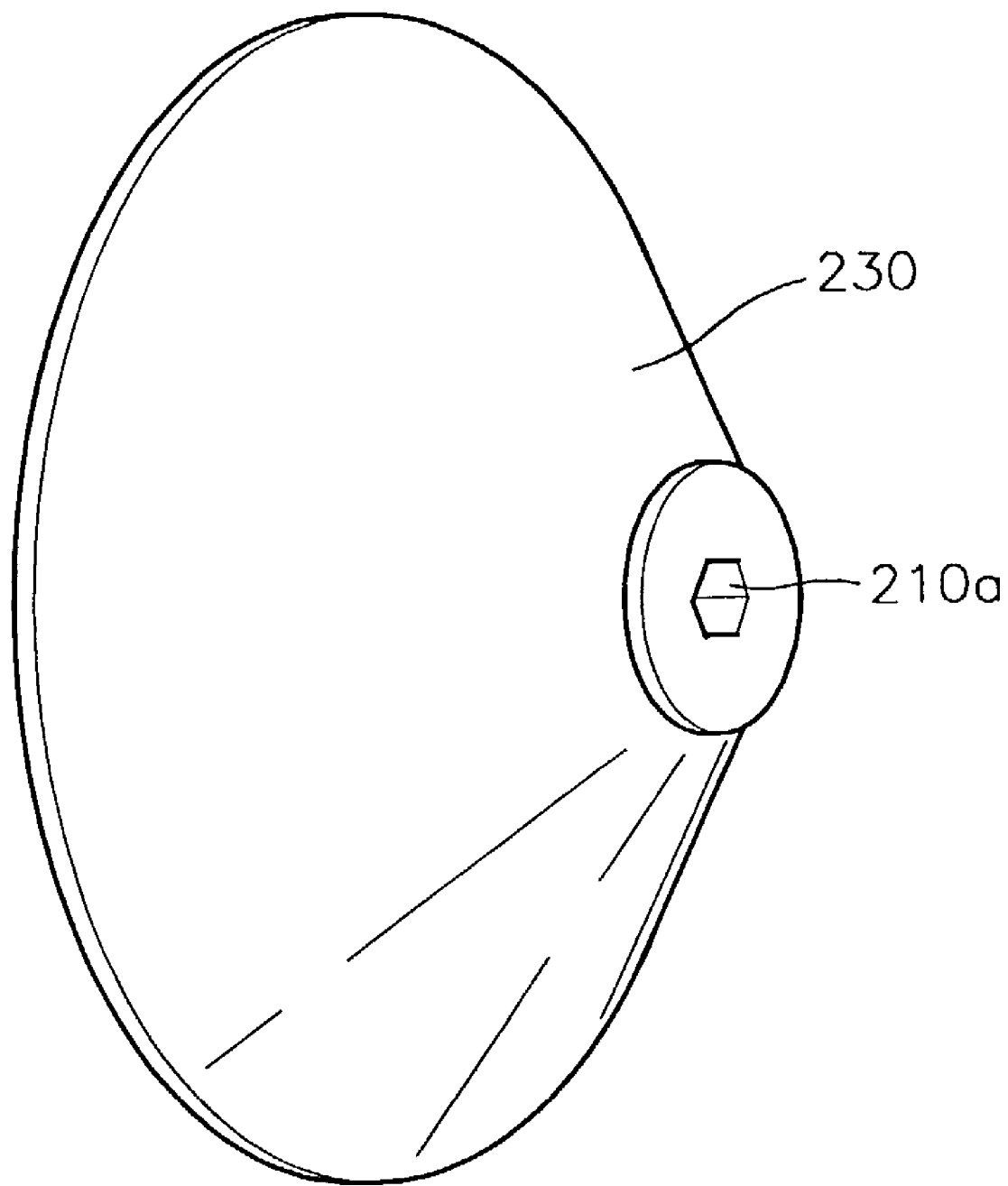
FIG. 7 is a perspective view of a gas blocking plate for blocking harmful gas from flowing into the internal electrode unit.

Referring to FIG. 4, ten sub-units of the annular plates 240 and the guide rings 250 are assembled together by a shaft 210 having a hexagonal cross-section penetrating through the center thereof. At this time, an auxiliary guide ring 260 is interposed between each of the sub-units. Once all the sub-units are assembled together over the shaft 210, a pair of funnel-like gas blocking plates 230, as shown in FIG. 7, are coupled to both ends of the shaft 210 in order to join and support the sub-units and to block harmful gas from flowing into the assembly of the sub-units, wherein both ends of the shaft 210 protruding though respective shaft holes 210a formed at the center of the gas blocking plates 230 are coupled with coupling nuts 212.

A method of installing the internal electrode unit 40 into the external electrode unit 30 will now be described.

Figure 6:
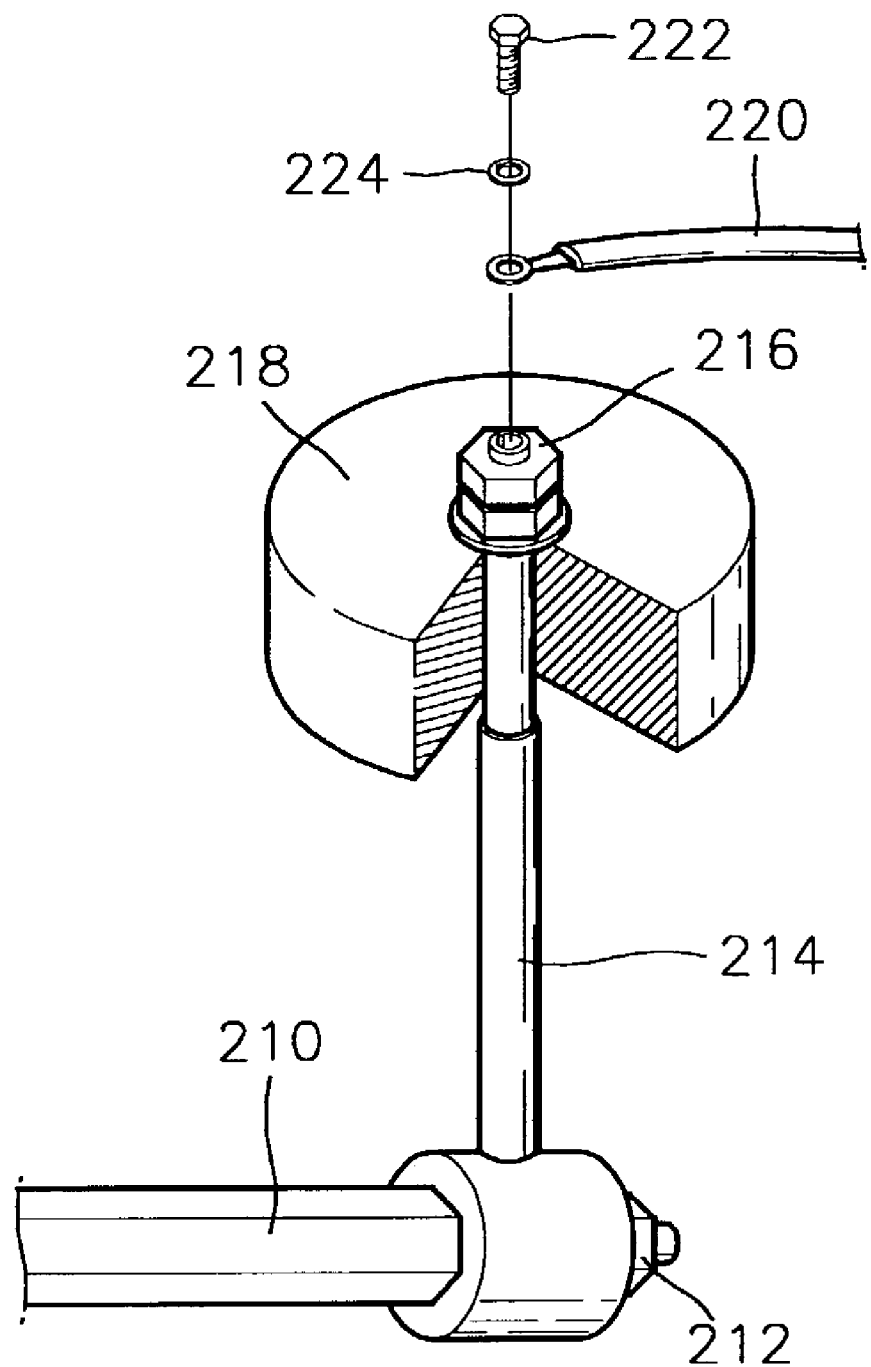
FIG. 6 is an exploded perspective view illustrating a support unit via which a high-frequency voltage is applied to the internal electrode unit of FIG. 5.

Referring to FIGS. 4 through 7, the internal electrode unit 40 is fixed on the housing 110 of the external electrode unit 30 while both ends of the shaft 210 penetrating through the annular plates 240 constituting the internal electrode unit 40 are connected to respective support units 214. In particular, one end of each of the support units 214 is connected to a respective end of the shaft, and the other ends of the support units 214 penetrate through insulating fixing units 218 and are coupled to coupling nuts 216. As shown in FIG. 4, the fixing unit 218 is fixed in a protruding portion of the housing 110 and is capped with a cover 112 by a coupling element 114. Referring to FIG. 6, a wire 220 electrically connected to the high voltage supply unit 50 shown in FIG. 1 is coupled to the other ends of the support units 214 by a washer 224 and a coupling bolt 222. The wire 220 externally extends through a hole 116 formed in the cover 112.

Figure 12:
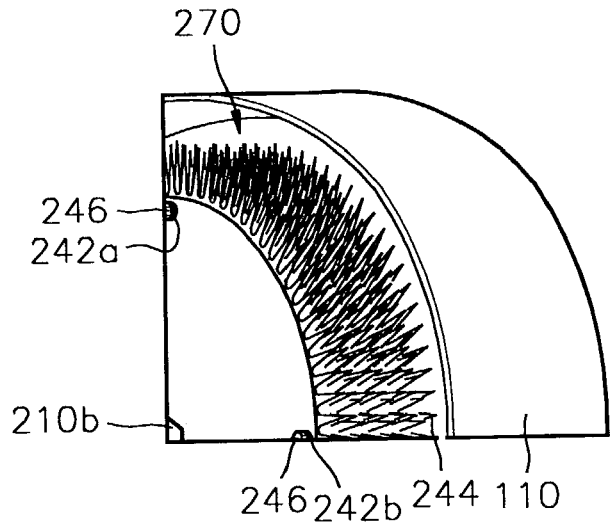
FIG. 12 is a partial perspective view showing a reaction space in the PFC decomposing apparatus according to an embodiment of the present invention.

FIG. 12 is a partial perspective view showing the reaction space 270 in the PFC decomposing apparatus according to an embodiment of the present invention. Referring to FIG. 12, the cylindrical housing 110 of the external electrode unit 30 is spaced a predetermined distance from the individual implanter poles 244 formed on the annular plates 240 constituting the internal electrode unit 40, thereby resulting in the reaction space 270 between the external electrode unit 30 and the internal electrode unit 40. The reaction space 270 may be conditioned at an ambient pressure and temperature. Harmful gases containing PFCs are decomposed in the reaction space 270 by vapor laser, electron beams, low temperature plasma, plasmon, plasma oscillations, ultraviolet (UV) rays, etc.

Regarding phenomena occurring in the reaction space 270, as gas molecules adsorbed on the metallic surfaces forming the reaction parts are irradiated with radiant light generated due to the application of a high voltage into the reaction space 270, the electromagnetic properties of the metallic material and the electromagnetic components of the radiant light interact, so that an electromagnetic field of the Raman scattered radiant light is greatly amplified.

As radiant light is emitted and scatters in the reaction space 270 of the PFC decomposing apparatus, Rayleigh scattering or Raman scattering, which are discriminated from one another by the wavelength of scattered light, occurs. Rayleigh scattering is a phenomena where radiant light in the reaction space 270 of the apparatus scatters into almost the same frequency as the incident light. In this case, the intensity of scattered light varies according to the size of particles, the wavelength of incident light, and the polarity of a sample, whereas the wavelength of the scattered light is consistent with that of the incident light regardless of the properties of particles. Raman scattering is a phenomenon where light incident on sample particles scatters into light of a different frequency from the incident light. The Raman scattering theory was first reported in 1928 by Indian physicist Dr. C. V. Raman. C. V. Raman was awarded a Nobel prize in physics in 1930 for the scientific value of his scattering theory and its highly probable applications in science and technical fields.

The most widely acknowledged theoretical model for the phenomenon occurring under high voltage conditions as in the reaction space 270 of the decomposing apparatus according to the present invention is the localized particle plasmon model based on Maxwell's equations.

As a high-frequency, high-voltage transducer applies high energy into the system, a high voltage of tens of kiloVolts and a high frequency component of several kiloHertz are induced in the system, creating a plasma state where ions, electrons, or neutral atoms, and molecules are uniformly distributed under an equilibrium of positive and negative charges.

Although the condition of the system is neutral as a whole, since particles having opposite charges are mixed up therein, microscopic electric fields are generated by the local separation of the ions and electrons, and electric currents and magnetic fields are induced due to motion of the charges. In addition, intermittent changes in the distribution of the charges cause the charged particles to oscillate, which is called "plasma oscillation". The quantized energy emitted during plasma oscillation is called "plasmon", and is classified as either of "bulk plasmon" or "surface plasmon".

When the oscillating electronic transition dipole moment of molecules occurs on the surface of the implanter poles 244 and between the sharp tips of the implanter poles 244, the optical characteristics of the molecules, for example, absorbance, fluorescence, etc., change, and therefore, the resonant Raman scattering characteristics also changes.

The surface characteristics of an electromagnetic field in the reaction space 270 affecting the intensity of a Raman scattering spectrum are as follows. First, the reflection of incident light in the electromagnetic field due to a high voltage emission increases the strength of the electromagnetic field. Second, dipoles generated due to the scattering of UV light lead to localized changes in the intensity of the electromagnetic field. Third, constructive interference of plasma on metal tip surfaces and scattered light, or a resonance effect amplifies the electromagnetic field in a light scattering area.

The local electromagnetic field amplified due to the scattering of molecules on the surface of the implanter poles 244 in the system provides the following effects. First, the transition oscillator strength, such as an absorption coefficient, increases due to the electric field generated by the reflected light. Second, the intensity of an energy band excited by the incident light increases. Third, the frequency of oscillating dipoles is slightly shifted.

When the arrangement of the implanter poles 244 is perpendicular to the surface of the annular plate thereof, the normal Raman scattering intensity is known to increase by about 30 times due to the amplified localized electromagnetic field. As the internal electrons of the SUS metal used for the system and oscillating dipoles resonate, the intensity of scattering is amplified.

When the electromagnetic field of the SUS metal is excited directly to a high energy level by the incident scattered light, the localized electromagnetic field intensity on the electrode metal surface in the reaction space is expected to be greatly amplified. A resonance between the metal component of the system and the electromagnetic field created by the incident light is induced by surface plasmons. Metal plasmons in the lowest energy region resonate with the common frequency of Raman scattered light and are generated only on the metal surface, so they are called "localized surface plasmons". Such localized surface plasmons may be manifested by electromagnetic waves traveling along the surface of the metal electrode in the reaction space within the system.

A transducer provides a high-frequency, negative high voltage as an energy source. Therefore, a wide range of electromagnetic waves are generated within the reaction space of the system. In this state, various new chemical and/or physical changes occur within the reaction space.

As an example, acetone molecules have strong bonds joining electron pairs, which are mostly C—C bonds. When acetone molecules are applied to an electrode that is highly likely to accept electrons, electrons are released from the acetone molecules. When a sufficient amount of energy is applied, one electron paired in the C—C bond is released while the other electron that has affinity with the field of intersecting electromagnetic lines of a wide band remains. As a result, the C—C bond with only one electron is easily cleaved into a positive methyl ion.

When a high voltage is applied to the sharp tips of the implanter poles to generate electromagnetic waves, the electron bond becomes unstable within electromagnetic waves that are repulsive to the electrons and is cleaved into separate electrons.

Regarding electrostatic phenomena, a charge electrode emits a high intensity of UV light, wherein the UV light nonspecifically activates the electrons. The UV light bombards electron pairs as an effective energy source for dissociating the electron pairs. Then, the separate electrons are readily moved into other molecules within electromagnetic waves that are repulsive to the electrons.

When acetone molecules are irradiated with UV light for a while, one electron of the electron pair in the C—C bond migrates into a region of electromagnetic waves that are repulsive to the electrons of the C—C bond. The C—C bond with the unpaired electron is likely to be cleaved.

As described above, an electron beam of a high energy and high density is efficiently generated within the reaction space 270 at an ambient temperature and an ambient pressure to dissociate the binding structure of a perfluorinated compound gas into hydrogen fluoride, water, and carbon dioxide, which can be processed further in the wet-type scrubber 60 (see FIG. 1).

Hereinafter, the high voltage supply unit 50 shown in FIG. 1 for processing the PFC gas will be described.

Figure 13A:
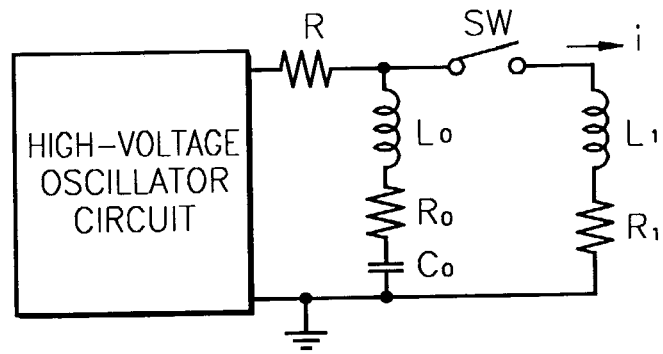
FIG. 13A is a circuit diagram of a high-capacity current generator using a general high-frequency voltage (HV) capacitor.
Figure 13B:
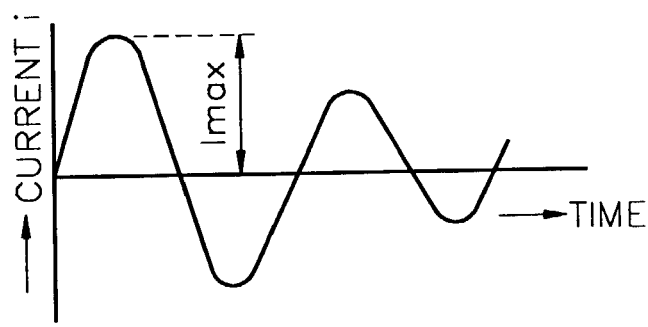
FIG. 13B is a load current waveform of the high-capacity current generator of FIG. 13A.

In an embodiment, a high-frequency voltage (HV) capacitor is used as a high-voltage current device for processing the PFC gas. The high-voltage current device, which causes expansion of the gas to increase pressure, may be implemented by connecting a plurality of small units of capacitors in series or in parallel. A general high-capacity current generator may be used as the high-voltage current device after its inherent characteristics are compensated for. When HV capacitors and other applicable parts are assembled, and a trigger time is varied, a very complicated current waveform can be obtained. FIG. 13A is a circuit diagram of a high-capacity current generator using a general HV capacitor, and FIG. 13B is a load current waveform of the high-capacity current generator of FIG. 13A. In FIG. 13A, $C_0$ denotes a condenser, R denotes a charging resistor, SW denotes a starting switch, $R_0$ denotes combined resistance, $L_0$ denotes inductance, $R_1$ denotes load resistance, $L_1$ denotes load inductance, and i denotes load current.

When the PFC decomposing apparatus according to the present invention is attached to such a high-capacity current generator with the HV capacitor $C_0$ fully charged, an equivalent crowbar circuit is constructed, which serves as an energy supply unit for the PFC processing system. When the electrical impedance of the PFC decomposing apparatus is entirely resistive, an exponentially attenuating waveform is obtained. When the electrical impedance of the PFC decomposing apparatus is entirely inductive, an oscillating waveform is obtained.

Figure 14A:
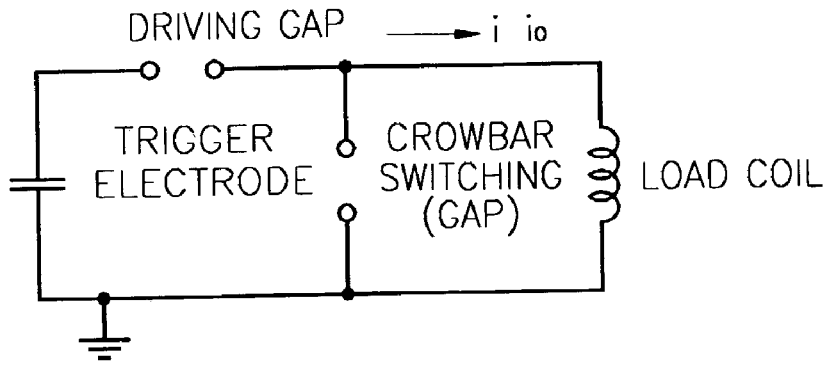
FIG. 14A is a basic circuit diagram of a conventional crossbar circuit.
Figure 14B:
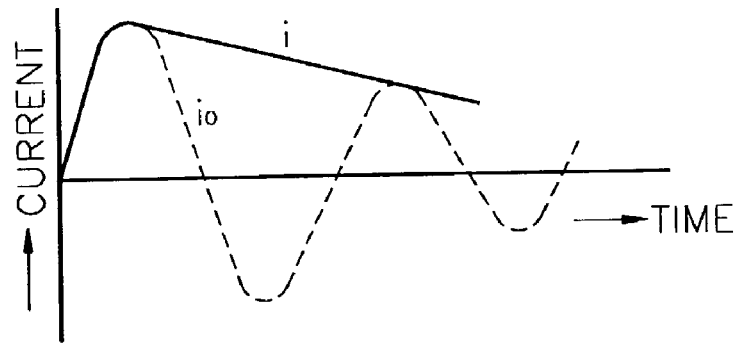
FIG. 14B is a load current waveform of the crossbar circuit of FIG. 14A.

FIG. 14A is a basic circuit diagram of a conventional crossbar circuit, and FIG. 14B is a load current waveform of the crossbar circuit of FIG. 14A. As shown in FIG. 14A, the conventional crossbar circuit includes a driving gap and a crowbar switching gap. In FIG. 4B, i denotes crowbar current, and $i_0$ denotes non-crowbar current.

Figure 15A:
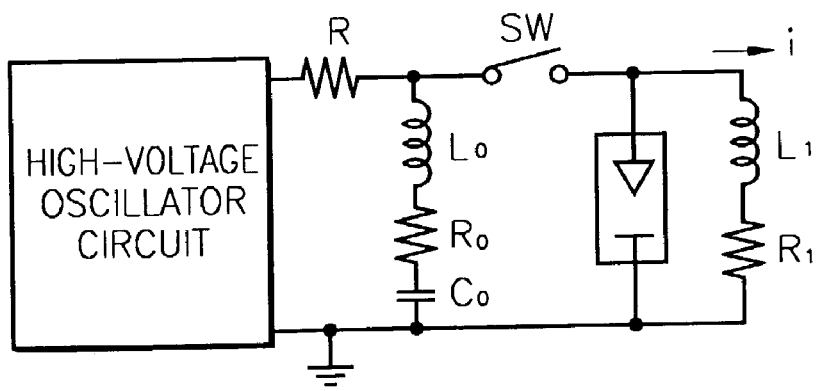
FIG. 15A is a diagram of an equivalent crowbar circuit connected to the PFC decomposing apparatus according to an embodiment of the present invention.
Figure 15B:
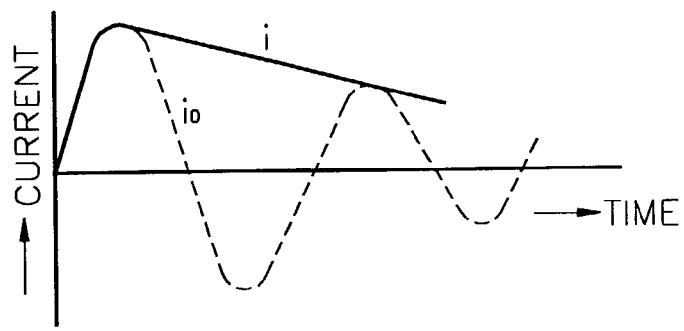
FIG. 15B is a load current waveform of the crowbar circuit of FIG. 15A.

For longer-wavelength energy generation, the capacitance or load resistance of the HV capacitor may be increased. However, the system size becomes large and the current level becomes low. Accordingly, the equivalent crowbar circuit described above is frequently used. In the crowbar circuit, the energy of the condenser $C_0$ is discharged to the load inductance. FIG. 15A is a diagram of an equivalent crowbar circuit connected to the PFC decomposing apparatus according to the present invention. FIG. 15B is a load current waveform of the crowbar circuit of FIG. 15A.

At a maximum inductance current level, i.e., when the energy of the HV capacitor is almost discharged, the PFC decomposing apparatus is overcharged. Immediately before overdischarging of the PFC decomposing apparatus, the current waveform attenuates to a time constant determined by the inductance and resistance of the circuit, as shown in FIG. 15B.

To generate a large amount of current, a plurality of HV capacitors need to be connected in series and in parallel, as described above, and the same voltage must be applied across each HV capacitor.

Figure 17:
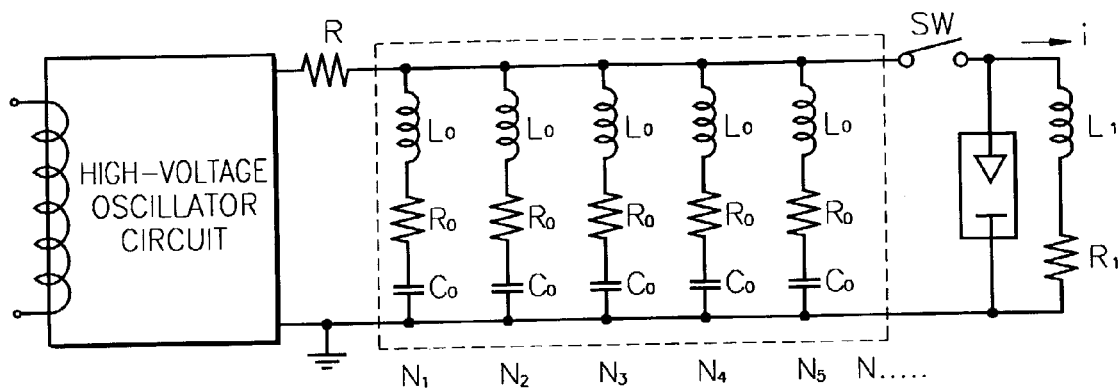
FIG. 17 is an equivalent circuit diagram of a high-frequency voltage supplying apparatus for a plurality of PFC decomposing apparatuses according to an embodiment of the present invention.
Figure 18:
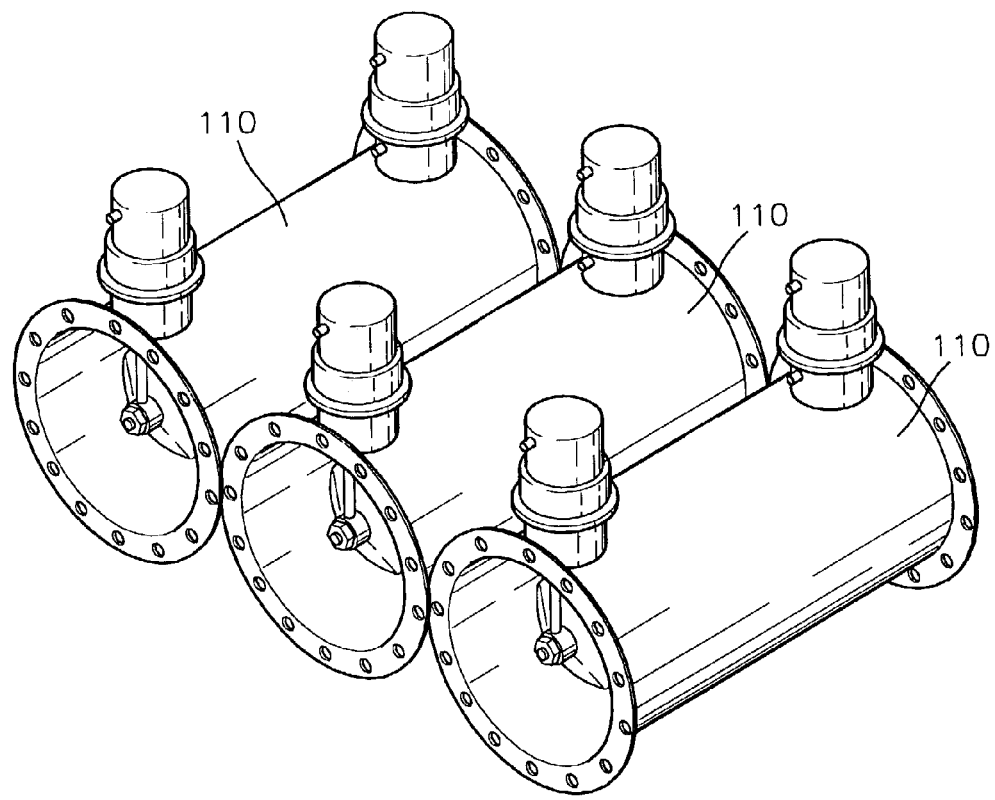
FIG. 18 is a perspective view of a plurality of PFC decomposing apparatuses according to an embodiment of the present invention arranged in parallel.
Figure 19:
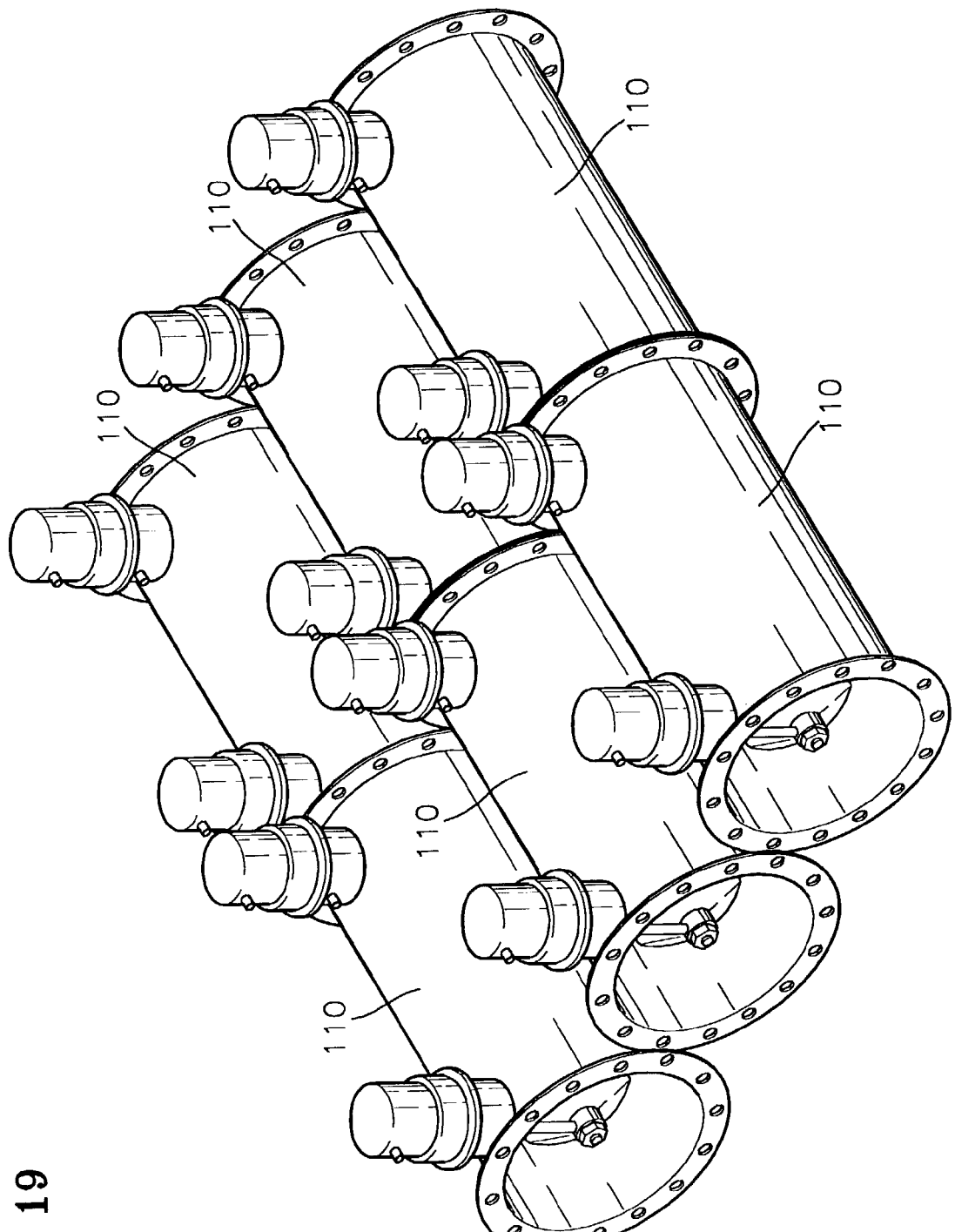
FIG. 19 is a perspective view of a plurality of PFC decomposing apparatuses according to an embodiment of the present invention arranged in series and in parallel.

FIG. 17 is an equivalent circuit diagram of a high-frequency voltage supplying apparatus for a plurality of PFC decomposing apparatuses according to the present invention. FIG. 18 is a perspective view of a plurality of PFC decomposing apparatuses according to the present invention arranged in series. FIG. 19 is a perspective view of a plurality of PFC decomposing apparatuses according to the present invention arranged in series and in parallel. In FIG. 17, N denotes the number of PFC decomposing apparatuses that are connected.

A PFC processing system according to the present invention, as shown in FIGS. 17 and 18, is for efficiently processing a large amount of PFCs. The processing system with the external electrode unit spaced from and parallel to the internal metal electrode unit requires a longer initial charging period in order for the entire system to be stably and fully charged with an essential amount of energy. In addition, after an amount of energy is discharged for processing, the system needs to be rapidly and continuously charged to retain a constant amount of energy therein. To this end, the waveform of supplying energy and a current supply should be appropriately controlled. Since the PFC processing system according to the present invention is a large-scale system including a plurality of PFC processing apparatuses connected in series and in parallel, it is very difficult to charge the system to a peak level within a short period of time.

To address this concern, a rectangular high-voltage current pulse having a steep rise period is preferred for the high voltage supply unit 50 according to the present invention. A method using a line pulser is used to generate rectangular current waves. A circuit including a plurality of lumped inductors L connected in series and a plurality of capacitors C connected in parallel is used to generate the rectangular current waves. The operational principles of the high voltage supply unit 50 according to the present invention are similar to those of the line pulser, in consideration of the electrical characteristics of the high voltage supply unit 50.

Figure 16A:
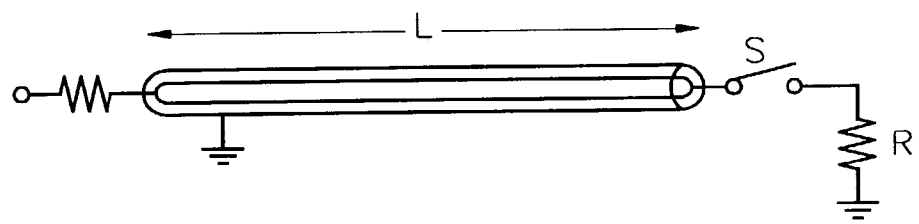
FIGS. 16A and 16B are 3-dimensional and 2-dimensional equivalent circuit diagrams, respectively, illustrating the principles of using rectangular waves to rapidly charge the PFC decomposing system according to an embodiment of the present invention.
Figure 16B:
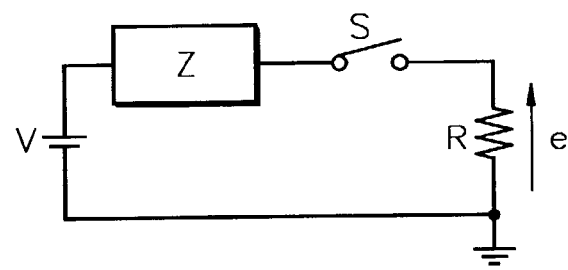
Figure 16C:
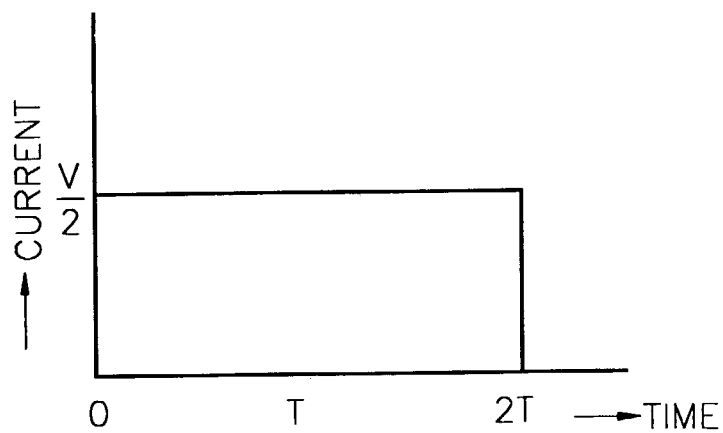
FIG. 16C is a waveform of the circuit of FIGS. 16A and 16B.

FIGS. 16A and 16B are 3-dimensional and 2-dimensional equivalent circuit diagrams, respectively, illustrating the principles of using rectangular waves to rapidly charge the PFC processing system according to the present invention. FIG. 16C is a waveform of the circuit of FIGS. 16A and 16B.

If the circuit is a zero-loss circuit with a constant lumped inductance L and capacitance C, pulses having no attenuation and distortion are generated. After charging to a voltage V and closing switch S, voltage e flows across road resistor R, as shown in FIG. 16B, wherein voltage e is expresses as:

$$e = RV/(Z+R)$$

When R=Z, a pulse having a voltage of V/2 and a width of 2T is generated, as shown in FIG. 16C, where T denotes a time required for a pulse to pass through the circuit and is expressed as T=L/v, wherein v denotes the velocity of waves. Through the above-described mechanism, the PFC processing system according to the present invention can be charged to a peak energy level required to operate within a short period of time.

The performance of the PFC processing system for processing various PFCs, which are commonly generated in the manufacture of semiconductor devices, at an ambient temperature and ambient pressure according to the present invention was evaluated. The results are shown in Table 1 below.

TABLE 1

| PFC gas | PFC concentration before processing | PFC concentration after processing | Reduction ratio (%) |
|---|---|---|---|
| $CF_4$ | 60 | 3 | 95 |
| $C_3F_8$ | 65 | 6 | 91 |
| $NF_3$ | 50 | 5 | 90 |

The PFC processing system tested was constructed by connecting processing units, each of which has a throughput of 10 m³/min, in parallel to provide a total throughput of 50 m³/min. The primary power consumption of the energy supply unit was 3φ, 220V, and 60 A or less. The processing efficiency was analyzed on-line using Fourier Transform Infra Red (FTIR) spectrometers attached to the front and rear ends of the processing system and using 10M-cells. FTIR spectrometers are commonly used worldwide to analyze PFC-containing exhaust gases, although they are not available for homogeneous molecules such as $F_2$, $Cl_2$, etc.

$C_3F_8$ and $NF_3$ are known to be used most frequently when cleaning a chamber after chemical vapor deposition (CVD), and $CF_4$ is a byproduct from the cleaning using $C_3F_8$. As shown in Table 1 above, the PFC processing system according to the present invention showed a processing efficiency of 90% or greater for all of the PFC gases analyzed.

According to the present invention, more processing units may be connected in series and further in parallel, as shown in FIGS. 18 and 19, in order to increase the processing efficiency. In other words, the number of processing units connected to construct a PFC processing system according to the present invention can be varied according to the desired processing efficiency and throughput.

A PFC processing system according to the present invention can be directly connected to an exhaust duct of a semiconductor manufacturing line, or by set up outside and used in conjunction with an existing semiconductor manufacturing line set up within a small space. Moreover, since a PFC processing system can be added to a conventional processing system using only scrubbers, costs associated with its implementation are low.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. An apparatus for decomposing perfluorinated compounds (PFCs), the apparatus comprising:
    a cylindrical external electrode unit which defines a flow space therein and through which PFCs can flow;
    a hollow internal electrode unit disposed within the flow space of the external electrode unit such that a reaction space is defined between the internal electrode unit and the external electrode unit, the internal electrode unit including coaxial annuli each having a plurality of implanter pole members, and annular guide members respectively interposed between each adjacent pair of the annuli,
    the implanter pole members of each annulus of said annuli protruding outwardly at the outer periphery of the annulus and spaced along the annulus in the circumferential direction thereof, and each of the pole members having a sharp tip so as to act as an electrode, and
    the thickness of each of the annular guide members being 2.5 to 3.5 times greater than the thickness of each adjacent pair of the annuli between which the annular guide member is disposed; and a voltage supply unit electrically connected to the internal electrode unit and configured to apply an alternating voltage to the internal electrode unit, whereby the alternating voltage is of sufficient potential and frequency as to generate within the reaction space electrical energy capable of decomposing PFCs.

2. The apparatus of claim 1, wherein each of the annuli of the internal electrode unit has a total of 30-110 of said implanter pole members.

3. The apparatus of claim 2, wherein each of the annuli of the internal electrode unit has a total of 75 of said implanter pole members.

4. The apparatus of claim 3, wherein the implanter pole members of each annulus of the annuli are angularly offset by 1.2 degrees with respect to the implanter pole members of the annulus adjacent thereto.

5. The apparatus of claim 1, wherein the external electrode unit and the internal electrode unit are formed of stainless steel (SUS).

6. The apparatus of claim 1, wherein the voltage supply unit comprises:

a support assemblage that supports the internal electrode unit as spaced uniformly from a cylindrical inner wall surface of the external electrode unit; and a voltage generator configured to generate the alternating voltage and electrically connected to the internal electrode unit via the support assemblage.

7. The apparatus of claim 6, wherein the support assemblage comprises support members that support both ends of the internal electrode unit, respectively.

8. The apparatus of claim 6, wherein the voltage generator comprises a crowbar circuit containing a discharge capacitor.

* * * * *